G. E. NUTTING.
Hose and Pipe Connections.
No. 134,158. Patented Dec. 24, 1872.
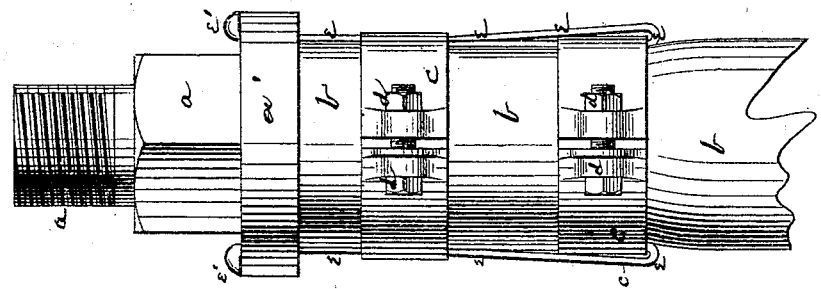
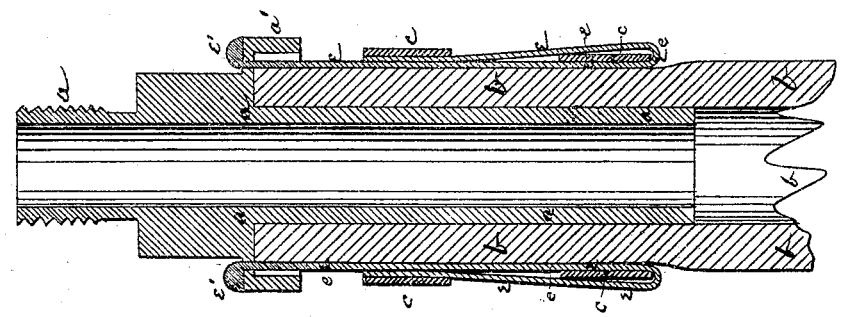

UNITED STATES PATENT OFFICE.

GEORGE E. NUTTING, OF NEW YORK, N. Y.

IMPROVEMENT IN HOSE AND PIPE CONNECTIONS.

Specification forming part of Letters Patent No. 134,158, dated December 24, 1872; antedated December 19, 1872.

*To all whom it may concern:*

Be it known that I, GEORGE E. NUTTING, of the city, county, and State of New York, have invented a new and useful Improvement for Fastening and Securing Rubber or other Flexible Hose to the Metallic Joints or Couplings, of which the following is a specification:

Rubber or other flexible hose, when subjected to very great pressure from steam or air under considerable compression, will sometimes be forced from the metallic coupling-joints, when secured thereto by the cramping-rings or other devices heretofore used. Such accidents are attended with danger to those in the vicinity, especially when steam is used, and they cause delay and loss of time. This inconvenience and loss are very serious when hose is used to conduct steam or compressed air for driving machinery for rock or stone drilling, especially where tunnels or shafts are being driven, and the machinery for operating the drills is necessarily placed at a distance from the steam-engine. Such operations require a number of coupling joints, which increase as the work advances; and accidents arising from the slipping of the hose from the joints are in such case exceedingly dangerous, and cause great delays and expense. My improvement is intended to render accidents from this source impossible, even when the pressure within the hose is equal to one hundred pounds to the square inch, as is sometimes the case in operating drilling machinery.

My improvement consists of a metallic strap or hook latch, one end of which passes through the solid ring of the metallic coupling-joint, and is secured there by an upset, and the other part of the strap, passing under the cramp-ring or rings and between the rings and the hose, is bent round the last ring, and is thence carried or folded upon itself under the other ring or rings first mentioned, when the end is secured by the compression of the ring.

In the accompanying drawing, Figure 1 is a longitudinal central section through the metallic coupling-joint and the part of the hose affixed to it, the accompanying rings, and my improved fastening-strap. Fig. 2 is an exterior elevation of the same.

In both figures similar letters represent similar parts.

$a\ a$ represents the metallic coupling joint and tube in one piece. $b\ b$ represents the hose surrounding the tube. $c\ c$ are the cramping-rings, the ends of which are bent outward, and through which a screw-bolt passes, provided with a nut by which the required compression is given to the ring, as seen at $d$, Fig. 2. The strap or latch hook which constitutes my invention is shown at $e$. It is composed of iron or steel flattened so as to pass readily under the rings and lie close upon the hose, and must be of suitable size and strength for the purpose. The upset-head is seen at $e'$, by which it is held to the solid ring $a'$ of the coupling-joint. It passes through a slot in the solid ring $a'$, thence underneath the cramp-rings until it comes to the last one, around which it is bent, and thence is carried folded upon itself under the cramp-ring or rings last mentioned. The end of the strap when it is secured is flattened.

I use two of these straps placed upon opposite sides of the hose. When the cramping-rings are secured together so as to compress the hose upon the tube it is impossible that the hose should be forced from the coupling tube and joint, as the strap will hold the rings and the hose under any pressure which the hose itself can sustain.

What I claim as my invention, and desire to secure by Letters Patent, is—

The strap or latch hook $e$, constructed, arranged, and operating to fasten and secure the hose to the coupling-joint, substantially as described.

GEO. E. NUTTING.

Witnesses:
J. B. STAPLES,
T. R. SHEAR.